(12) United States Patent
Amendola et al.

(10) Patent No.: US 7,316,718 B2
(45) Date of Patent: Jan. 8, 2008

(54) DIFFERENTIAL PRESSURE-DRIVEN BOROHYDRIDE BASED GENERATOR

(75) Inventors: Steven C. Amendola, Ocean, NJ (US); Richard M. Mohring, East Brunswick, NJ (US); Phillip J. Petillo, Ocean, NJ (US); Keith A. Fennimore, Columbus, NJ (US); Stephen C. Petillo, Ocean, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 695 days.

(21) Appl. No.: 09/902,899

(22) Filed: Jul. 11, 2001

(65) Prior Publication Data

US 2003/0009942 A1 Jan. 16, 2003

(51) Int. Cl.
B01F 7/08 (2006.01)
B01J 8/08 (2006.01)
(52) U.S. Cl. ........................ 48/61; 48/127.9; 48/197 R; 422/225; 422/229; 422/222; 423/657; 423/648.1; 423/658.2
(58) Field of Classification Search .................... 48/61, 48/62 R, 118.5, 197 R; 423/657, 658.2; 422/211, 222, 234–237
See application file for complete search history.

(56) References Cited

U.S. PATENT DOCUMENTS

| | | | |
|---|---|---|---|
| 1,935,627 A * | 11/1933 | Falter | 422/119 |
| 2,534,533 A | 12/1950 | Schlesinger et al. | |
| 3,210,157 A | 10/1965 | Lewis, Jr. et al. | |
| 3,940,474 A | 2/1976 | Huskins et al. | |
| 3,951,568 A * | 4/1976 | Carlson, Jr. | 417/27 |
| 4,012,016 A * | 3/1977 | Davenport | 244/97 |
| 4,055,632 A | 10/1977 | Hoffman et al. | |
| 4,553,981 A * | 11/1985 | Fuderer | 48/62 R |
| 4,601,305 A * | 7/1986 | Nordskog | 137/528 |
| 4,628,010 A | 12/1986 | Iwanciow | |
| 4,784,295 A * | 11/1988 | Holmstrand | 222/148 |
| 5,804,329 A | 9/1998 | Amendola | |
| 6,316,133 B1 | 11/2001 | Bossel | |
| 6,358,488 B1 | 3/2002 | Suda | |
| 6,375,906 B1 * | 4/2002 | Edlund et al. | 422/189 |
| 6,534,033 B1 * | 3/2003 | Amendola et al. | 423/648.1 |
| 6,592,741 B2 | 7/2003 | Nakanishi | |
| 6,683,025 B2 * | 1/2004 | Amendola et al. | 502/439 |
| 2001/0022960 A1 * | 9/2001 | Kojima et al. | 423/657 |
| 2003/0037487 A1 * | 2/2003 | Amendola et al. | 48/76 |
| 2004/0033194 A1 * | 2/2004 | Amendola et al. | 423/658.2 |
| 2004/0035054 A1 * | 2/2004 | Mohring et al. | 48/61 |
| 2004/0047801 A1 * | 3/2004 | Petillo et al. | 423/657 |
| 2004/0148857 A1 * | 8/2004 | Strizki et al. | 48/127.9 |

FOREIGN PATENT DOCUMENTS

WO 0174710 10/2001

OTHER PUBLICATIONS

H.I. Schlesinger, et al., "Sodium Borohydride: Its Hydrolysis and Its Use as a Reducing Agent in the Generation of Hydrogen," Journal of the American Chemical Society, 1953, 75, 215-219.

(Continued)

Primary Examiner—Glenn Caldarola
Assistant Examiner—Kaity Handal
(74) Attorney, Agent, or Firm—Dickstein Shapiro LLP

(57) ABSTRACT

An arrangement for generating hydrogen gas utilizes differential pressure to transport fuel and spent fuel components without requiring an electrically powered fuel delivery pump.

11 Claims, 9 Drawing Sheets

OTHER PUBLICATIONS

C. M. Kaufman and B. Sen. "Hydrogen generation by hydrolysis of sodium tetrahydroborate: Effects of acids and transition metals and their salts," Journal of the Chemical Society, Dalton Transactions, 1985, 307-313.

C. A. MacCarley, Symposium on Alternative Fuel Resources, Santa Maria, CA, Mar. 1976.

Maurice E. Indig and Richard N. Snyder, "Sodium Borohydride, An Interesting Anodic Fuel", Journal of the Electrochemical Society, vol. 109, pp. 1104-1106, Nov. 1962.

* cited by examiner

DIFFERENTIAL PRESSURE-DRIVEN BOROHYDRIDE BASED GENERATOR

FIELD OF THE INVENTION

The invention relates to a method and arrangement for generating hydrogen gas using a catalyst from a fuel such as borohydride. More particularly, the invention relates to a method and arrangement in which fuel is delivered to a catalyst chamber by means of internally generated differential pressure without requiring an elaborate electrically powered pumping system.

BACKGROUND OF THE INVENTION

Hydrogen is a "clean fuel" because it can be reacted with oxygen in hydrogen-consuming devices, such as a fuel cell or combustion engine, to produce energy and water. Virtually no other reaction byproducts are produced in the exhaust. As a result, the use of hydrogen as a fuel effectively solves many environmental problems associated with the use of petroleum based fuels. Safe and efficient storage of hydrogen gas is, therefore, essential for many applications that can use hydrogen. In particular, minimizing volume, weight and complexity of the hydrogen storage systems are important factors in mobile applications.

Several methods of storing hydrogen currently exist but are either inadequate or impractical for wide-spread consumer applications. For example, hydrogen can be stored in liquid form at very low temperatures. Cryogenic storage provides a volume density of 70 grams of hydrogen per liter, but is limited further by the weight of tanks required for storage which limits its use for consumer applications. In addition, the energy consumed in liquefying hydrogen gas is about 60% of the energy available from the resulting hydrogen. Finally, liquid hydrogen is not safe or practical for most consumer applications.

An alternative is to store hydrogen under high pressure in cylinders. However, a 100 pound steel cylinder can only store about one pound of hydrogen at about 2200 psi, which translates into 1% by weight of hydrogen storage. More expensive composite cylinders with special compressors can store hydrogen at higher pressures of about 4,500 psi to achieve a more favorable storage ratio of about 4% by weight. Although even higher pressures are possible, safety factors and the high amount of energy consumed in achieving such high pressures have compelled a search for alternative hydrogen storage technologies that are both safe and efficient.

An alternate hydrogen generation technology has been developed for producing hydrogen on demand using a stabilized metal hydride solution and a hydrogen generation catalyst system. Typically, such a system requires an elaborate pumping system and an electrical power supply for moving the metal hydride solution into the hydrogen generation catalyst system and for removal of spent reactant.

SUMMARY OF THE INVENTION

Accordingly, it is an object of the invention to provide a hydrogen generation system which does not require a pumping system which is operated by an external electrical power source.

It is another object of the invention to provide a hydrogen generation system which requires no electrical power to operate.

It is a further object of the invention to provide a hydrogen generation system which can be used to augment of a hydrogen generation system containing an electrically powered pump by reducing the differential pressure load on the pump.

It is another object of the invention to provide a hydrogen power generation system which can be used to augment military and small stationary hydrogen generation systems used as micropower sources.

These and other objects of the invention are achieved by providing an arrangement for generating hydrogen gas comprising a catalyst chamber including a catalyst, a fuel chamber comprising a reactant material capable of generating hydrogen gas when contacting the catalyst, a spent fuel chamber connected to the catalyst chamber for receiving spent reactant material and hydrogen gas, a conduit between the fuel chamber and spent fuel chamber which includes a check valve, and an outlet conduit connected to the check valve.

The invention also provides for a method for generating hydrogen gas using such an arrangement in which pressure is applied to the fuel chamber causing reactant material to be transported to and contacted with a catalyst thereby generating hydrogen gas and spent reactant material.

DETAILED DESCRIPTION OF THE PREFERRED EMBODIMENTS

The present invention provides for an arrangement for generating hydrogen gas which does not require an electrically powered pump to move catalyst or reactant components. Instead, the novel arrangement utilizes internally generated differential pressure to control transport of reactant to the hydrogen generation catalyst.

Figure 1:
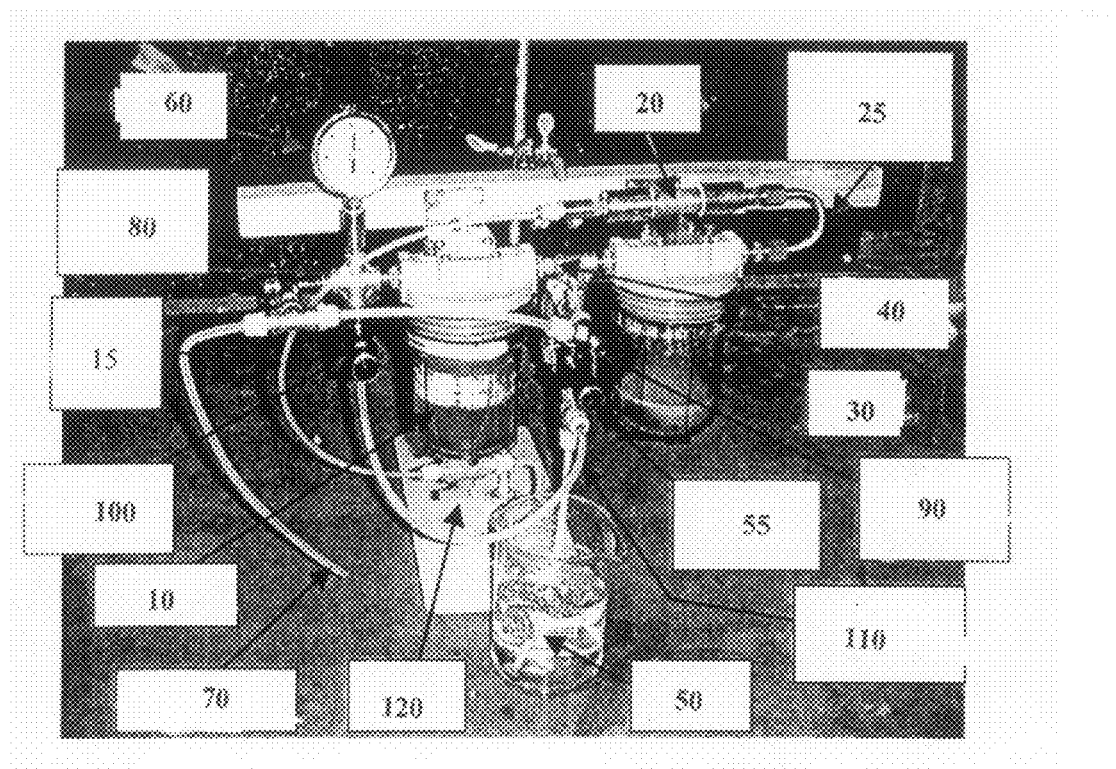
FIG. 1 is an illustration of an arrangement for a hydrogen gas generation system in accordance with the invention.

In an embodiment of the invention shown in FIG. 1, the hydrogen gas generation arrangement includes a borohydride fuel vessel 10 which is connected to a catalyst chamber 20 through a fuel inlet line 15. Upon reaction of the borohydride fuel with the catalyst, borate and hydrogen gas flow from the outlet of the catalyst chamber 20 into the spent fuel chamber 30. By locating the catalyst remote from the fuel chamber, the fuel and spent fuel are separated from each other avoiding constant dilution of the fuel concentration.

The spent fuel chamber 30 is connected to the fuel vessel 10 by a conduit having a check valve 40 which allows hydrogen gas flow only in one direction. A hydrogen gas outlet line 50 conveys hydrogen gas out of the system. A delivery pressure/flow regulator 55 can be used to control hydrogen flowing to the outlet line 50. A pressure gauge 60 can be used to monitor the pressure in the system. A set pressure regulator/relief valve 100 can be used to set and maintain the maximum operating pressure of the system by relieving pressure directly to the outlet line 50 via a bypass line 110. As a safety precaution a manual pressure relief outlet line 70 and manual pressure relief safety valves 80 and 90 can release pressure in the event set pressure regulator/relief valve 100 is unable to set and maintain the pressure in the system. A fuel shut-off valve 120 can stop fuel from being transported to the catalyst chamber.

The invention will be better understood in view of the following example which is merely illustrative and is not meant to limit the scope of the invention.

EXAMPLE 1

Figure 2:
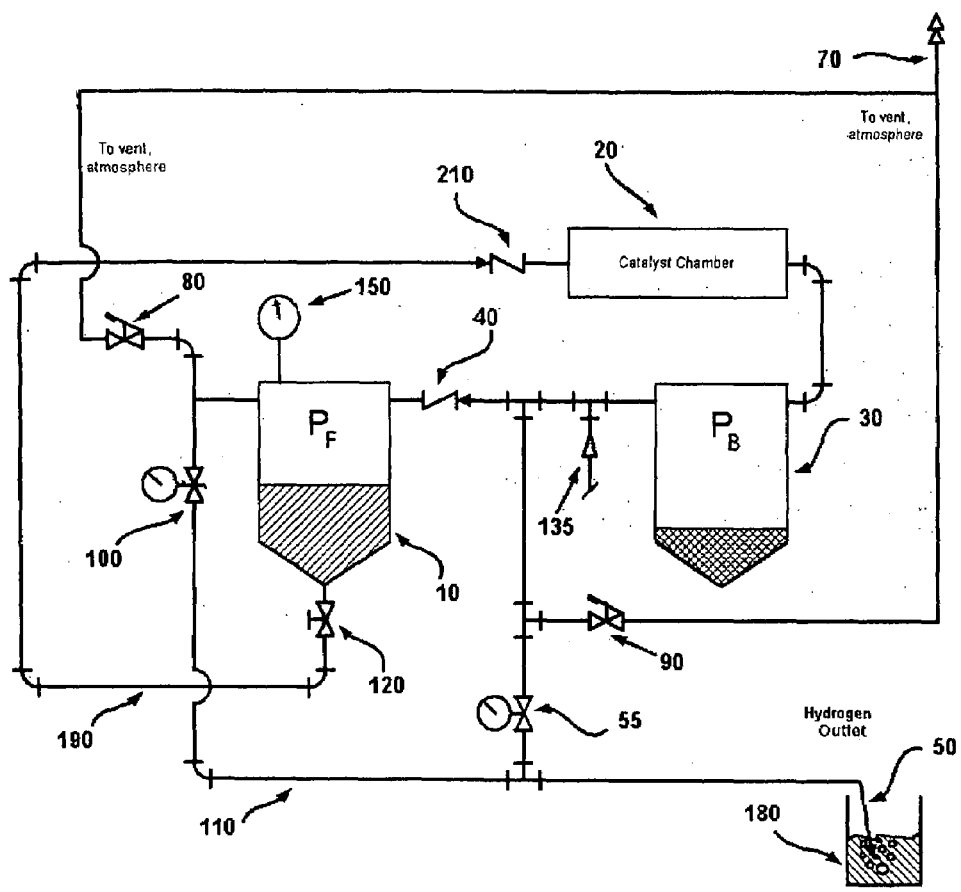
FIG. 2 is a schematic illustration of the arrangement for a hydrogen gas generation system in FIG. 1.

A schematic diagram of the arrangement in FIG. 1 according to the invention is shown in FIG. 2. A fuel solution comprising 20% $NaBH_4$ by weight, 3% NaOH by weight, and 77% $H_2O$ by weight was poured into fuel vessel 10 such that approximately half the vessel was filled with solution. An initial pressure was supplied to the system by introducing $N_2$ gas through line 135 with regulator valve 55 in a closed position. Note that the source of the initial pressure is not limited to $N_2$ gas; for example, it could alternatively be $H_2$ gas arising from forcing a small amount of fuel over the catalyst. The pressure gauge 150 read 15 psi. The fuel shut-off valve 120 was opened and as expected, no pressure drop was observed. To initiate hydrogen generation, regulator valve 55 was opened about halfway. Gas began to flow out of outlet line 50 as evidenced by the appearance of bubbles in water beaker 180. Very soon after the bubbling began, fuel was observed moving through the fuel inlet line 190 into the catalyst chamber 20 through check valve 210. The catalyst chamber 20 surface temperature increased to approximately 60° C. and borate and hydrogen gas flowed into spent fuel vessel 220.

The pressure observed at pressure gauge 150 was approximately 16 psi and was relieved via set pressure regulator/relief valve 100 to the outlet line 50. As the pressure dropped to approximately 15 psi on gauge 150, more fuel flowed from fuel vessel 10 to catalyst chamber 20 due to the fact that the pressure $P_F$ in the fuel vessel 10 was greater than the pressure $P_B$ in the spent fuel vessel 30. The pressure at gauge 150 rose again to approximately 16 to 17 psi and the same cycle of pressure drop and pressure rise due to the transport of fuel and generation of hydrogen gas was repeated. The generated $H_2$ rate was measured as roughly 1.5 SLM (Standard Liters per Minute), or the equivalent of about 100 watts of equivalent fuel cell power, operating at a delivery of approximately 15 psi.

The regulator 55 was adjusted to vary the flow rate and no detrimental effects were observed. The outlet line 50 was blocked with a finger thereby stopping gas flow. Upon removal of the finger, flow generation immediately continued and no detrimental effects were observed.

The system was allowed to run until the fuel vessel 10 was virtually empty of fuel. After the fuel was consumed the system was depressurized through outlet line 50. The spent fuel collected in chamber 30 was examined. The spent fuel exhibited a fairly high conversion yield estimated as greater than 80%. Based on this experiment it is estimated than such an arrangement according to the invention could operate at approximately 1.5 SLM for approximately 4.3 hours using 750 ml of 20 wt. % $NaBH_4$, assuming a 100% conversion.

Figure 3:
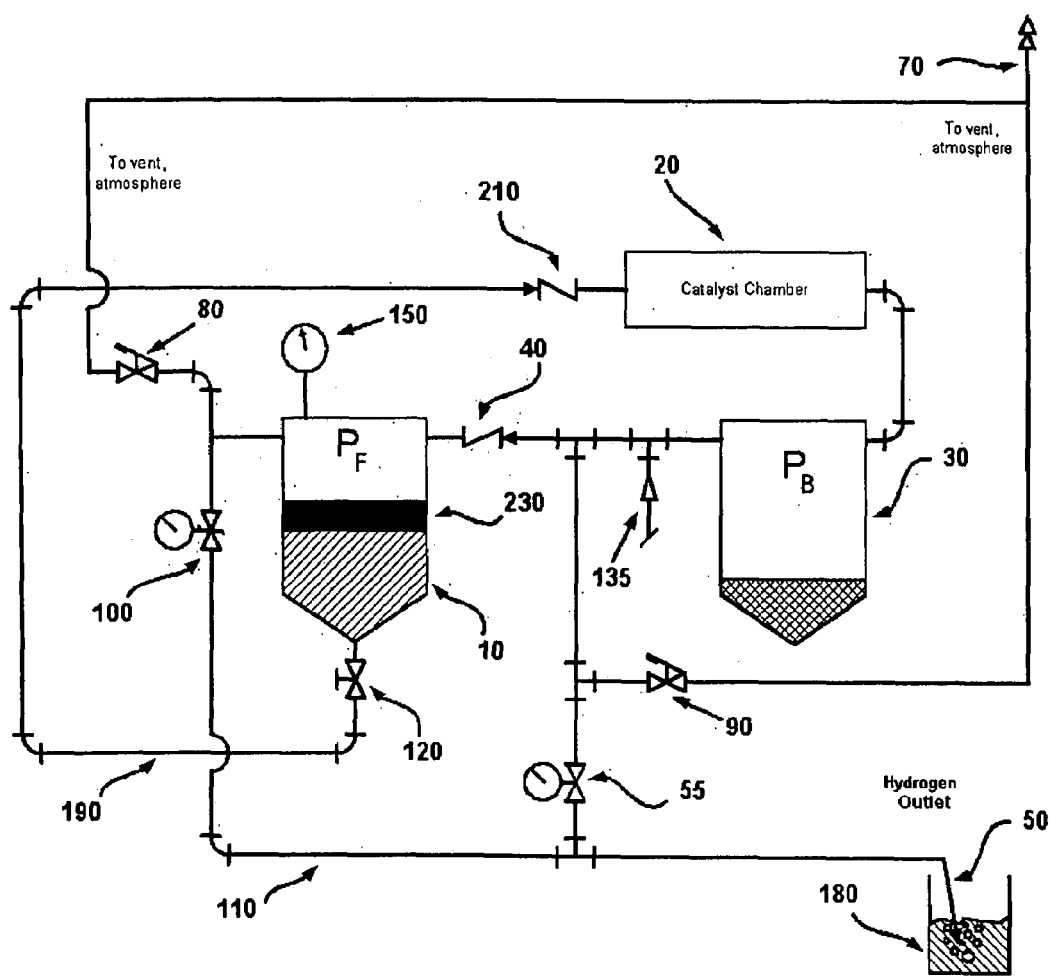
FIG. 3 is a schematic illustration for a hydrogen gas generation system in accordance with the invention in which the fuel vessel includes a piston.
Figure 4:
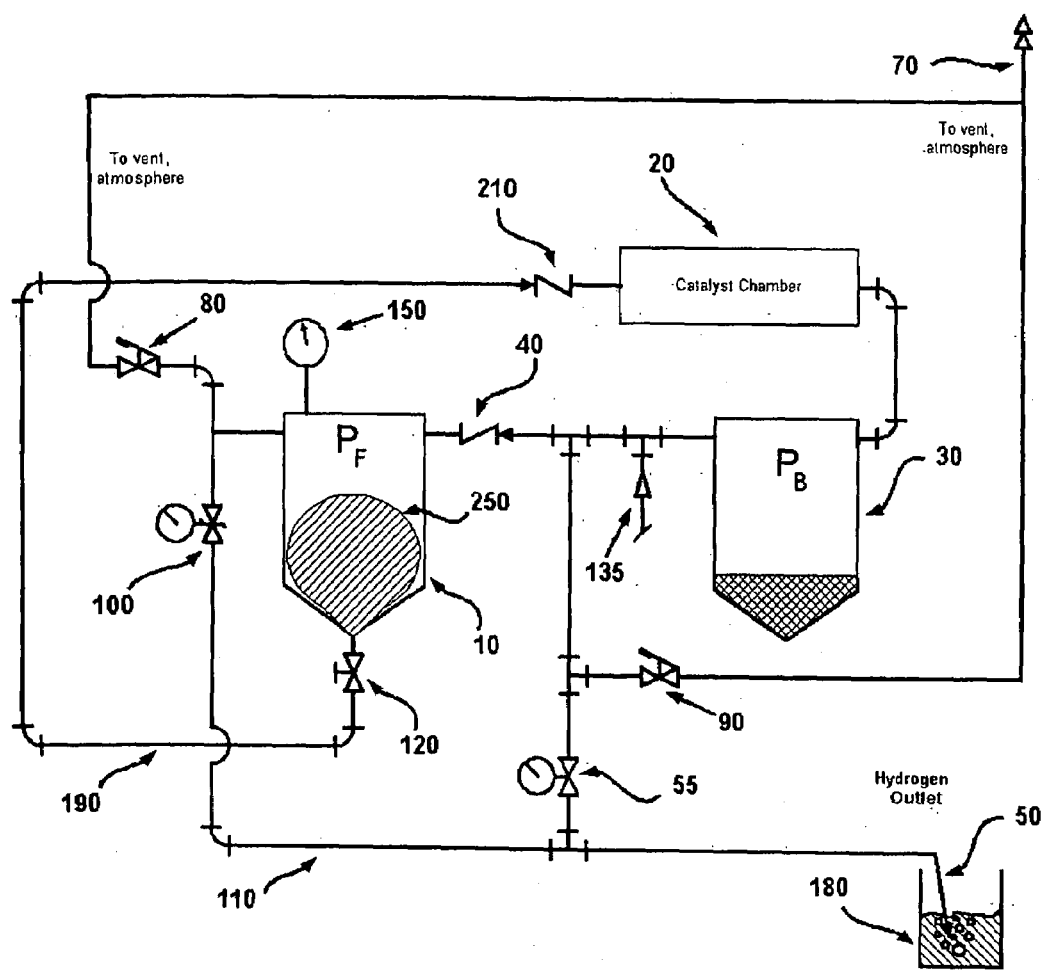
FIG. 4 is a schematic illustration for a hydrogen gas generation system in accordance with the invention in which the fuel vessel includes a flexible bladder.

In another embodiment of the invention shown in FIG. 3, the fuel vessel 10 can incorporate a piston 230 to retain the hydrogen gas pressure separate from the fuel liquid. This can allow the fuel vessel 10 to be oriented in any direction without relying upon the direction of gravity to direct the fuel downward out of the fuel vessel 10. That is, the piston 230 prevents the hydrogen gas providing the pressure $P_F$ from traveling through the fuel shut-off valve 120. In another embodiment of the invention shown in FIG. 4, the fuel vessel 10 can incorporate a flexible bladder 250 to achieve similar directional independence of the fuel vessel 10.

Figure 5:
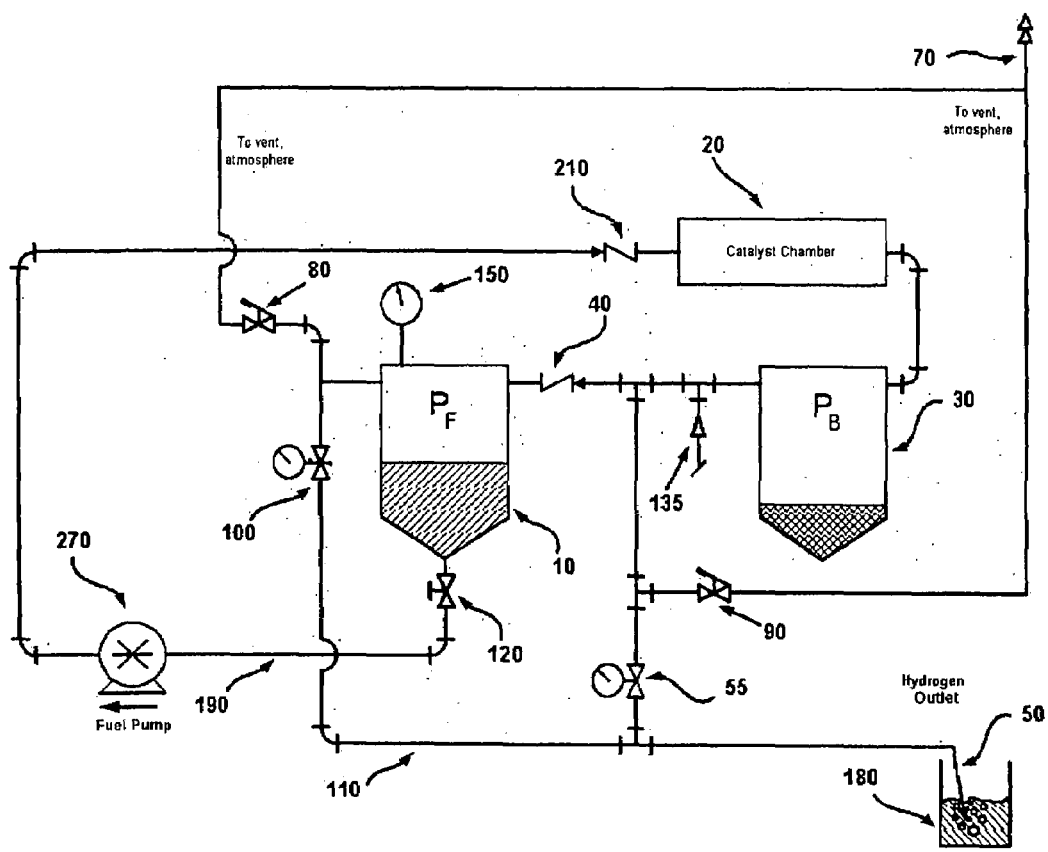
FIG. 5 is a schematic illustration for a hydrogen gas generation system including a fuel pump in accordance with the invention.

In another embodiment of the invention shown in FIG. 5, a fuel pump 270 can be interposed between the fuel shut-off valve 120 and the catalyst chamber inlet check valve 210. The fuel pump 270 may require external power to operate, however, the system is enhanced due to the fact that the pump is required to pump only against the differential pressure ($P_B-P_F$) as opposed to a typical system in which the pump would be required to pump against the pressure $P_B$. The reduced differential pressure will reduce the strain on the pump, may allow for delivery pressures higher than achievable without the differential pressure enhancement, and may make pump specification and purchase easier.

Figure 6:
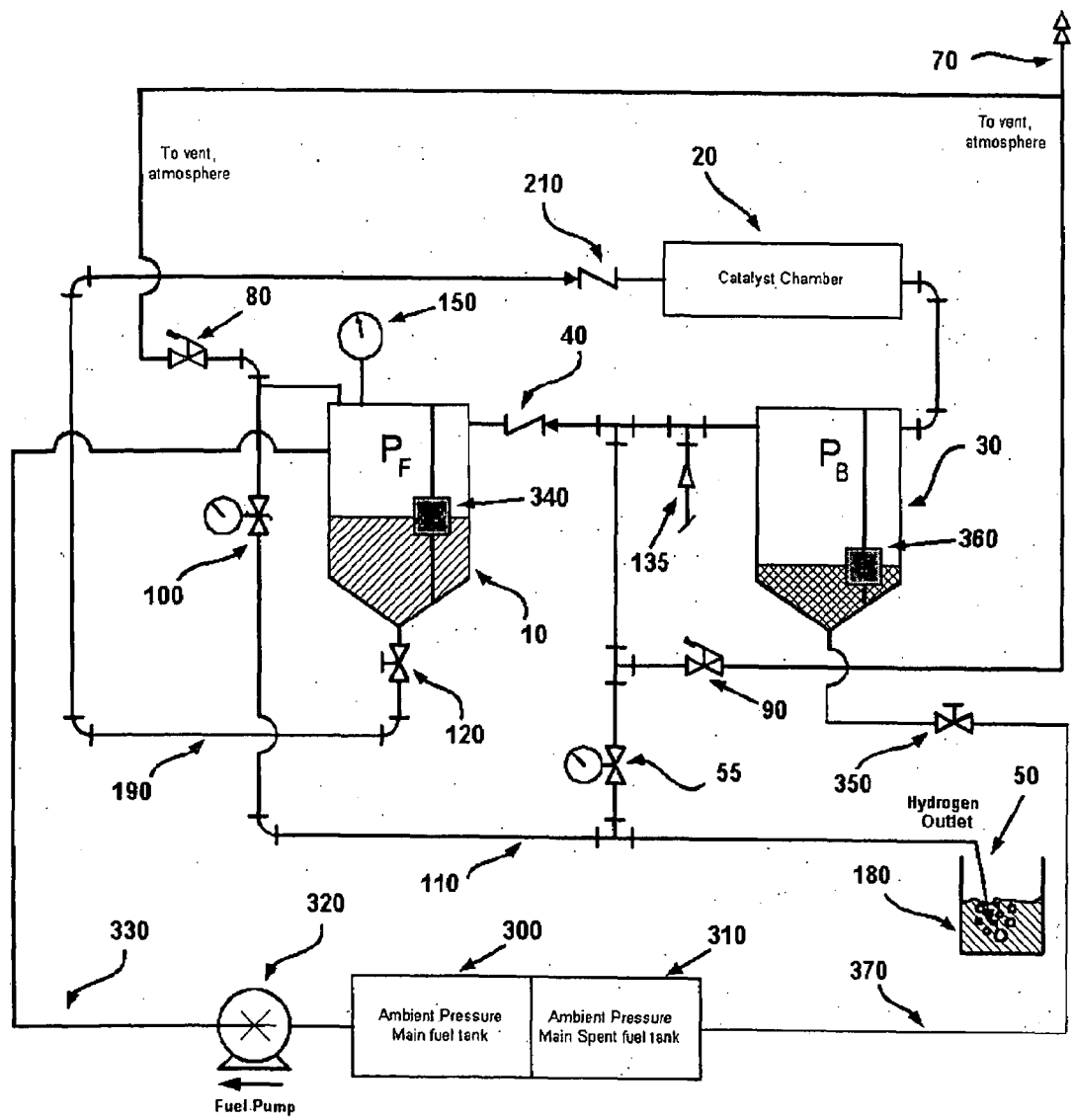
FIG. 6 is a schematic illustration for a hydrogen gas generation system including a fuel level sensor in accordance with the invention.

In another embodiment of the invention shown in FIG. 6, a large reservoir of fuel is stored at ambient pressure in a main fuel tank 300. A fuel level sensor 340 senses the fuel level within the fuel vessel 10. When the fuel level sensor 340 senses a predetermined "low" level, the fuel pump 320 turns on and pumps fuel through the fuel line 330 refilling the fuel vessel 10. When the fuel level sensor 340 senses that the fuel level has reached a predetermined "full" level, the fuel pump 320 turns off ceasing delivery of fuel via fuel line 330. Additionally, during this cycle, the spent fuel drain valve 350 can open allowing the hydrogen pressure ($P_B$) within the spent fuel vessel 30 to push the spent fuel through the spent fuel drain line 370 into the ambient pressure main spent fuel tank 310. When the spent fuel level sensor 360 senses a predetermined "low" level of spent fuel, the spent fuel drain valve 350 can be closed. This embodiment, while possibly requiring external power to run some of the components has the potential advantage of much larger fuel and spent fuel tanks that are both at ambient pressure. Essentially, this allows the system to be run for much longer periods of time (if not constantly) between refueling and/or draining spent fuel. Of course, the exact arrangement and sequence detailed in this example is simply illustrative and is not meant to limit the scope of the invention.

Figure 7:
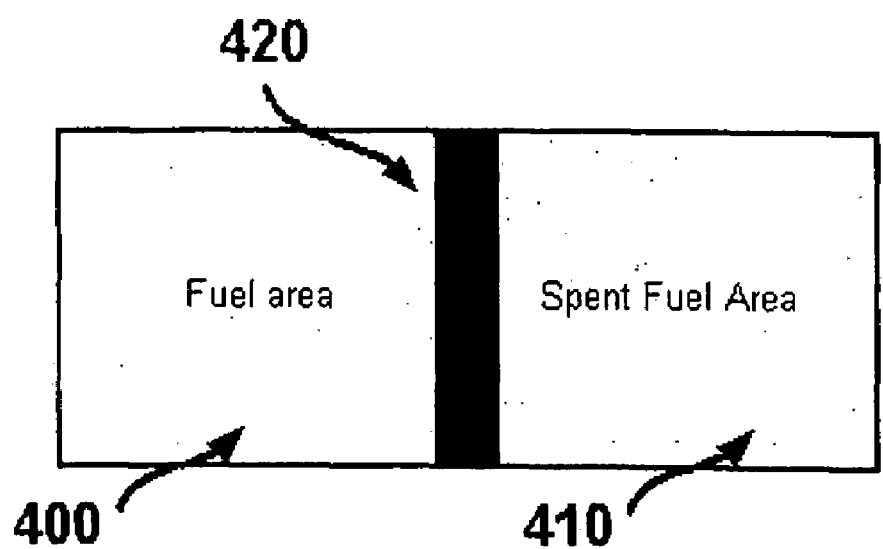
FIG. 7 is an illustration of a volume exchange tank for use in the invention.
Figure 8:
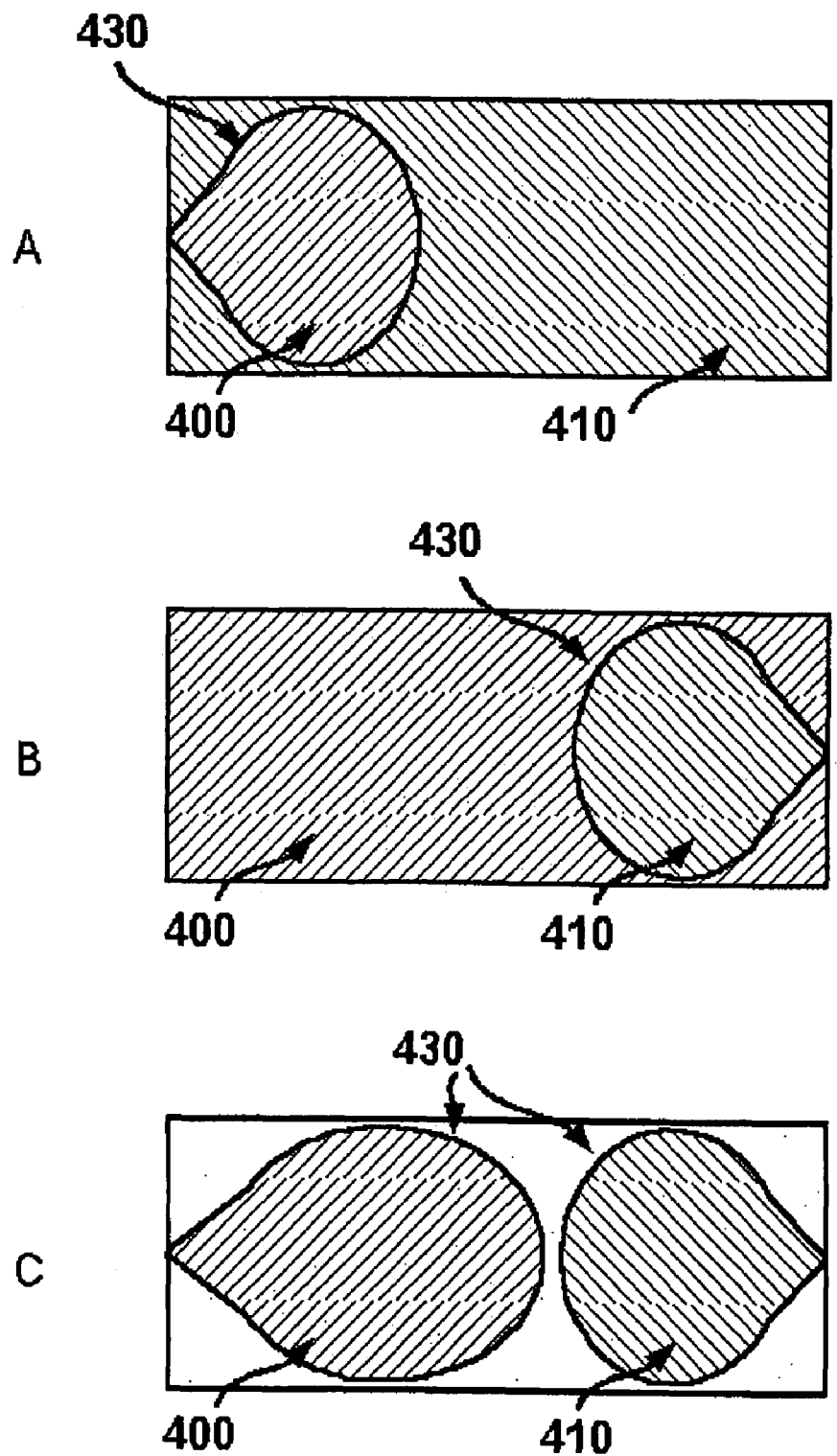
FIGS. 8A, 8B and 8C are schematic illustrations of flexible bladder arrangements for housing fuel, spent fuel or both respectively, in accordance with the invention.

FIG. 7 shows an alternative embodiment of the ambient pressure tanks 300 and 310 used in FIG. 6. The two ambient pressure tanks 300 and 310 are replaced by a single "volume exchanging tank" comprising a fuel area 400, a spent fuel area 410, and a movable partition 420 (e.g., a piston). As fuel is consumed from the fuel area 400 and spent fuel is returned to the spent fuel area 410, the movable partition 420 slides such that space that originally occupied by fuel becomes occupied by spent fuel. This has the obvious advantage of reducing the overall volume needed to store both fuel and spent fuel. The movable partition 420 can be designed as a heat insulator. Also, the movable partition 420 can be eliminated if either the fuel, spent fuel, or both materials are contained within a flexible bladder 430 as in FIGS. 8A, 8B, and 8C.

Figure 9:
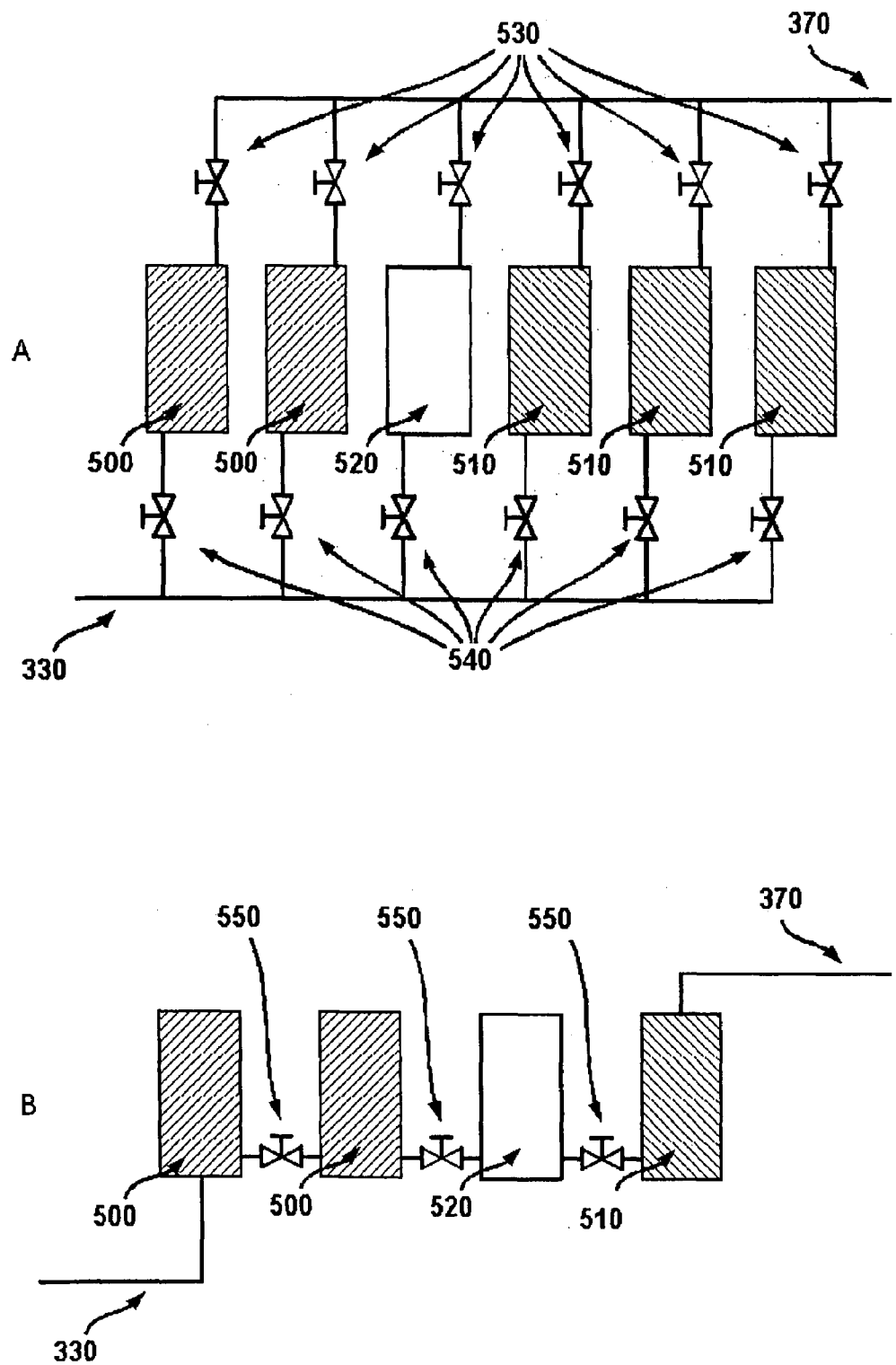
FIG. 9A is an illustration of a plurality of tanks arranged in parallel for use in the invention and FIG. 9B is an illustration of a plurality of tanks which can be individually selected for use in accordance with the invention.

Another embodiment of a volume exchanging tank is shown in FIGS. 9A and 9B. The system contains any number of discrete tanks that initially contain fuel 500 or are empty 520. When the fuel contained within a given fuel tank 500 is consumed, the tank is then to be used for storing spent fuel such as tank 510, and fuel is consumed from a different fuel tank 500. The system in FIG. 9A shows how the tanks can be multiplexed in parallel via the fuel control valves 540 and spent fuel control valves 530 to direct the fuel into the fuel line 330 and direct spent fuel from the spent fuel line 360, respectively. FIG. 9B shows an embodiment in which the tanks can be selectively filled in series via the control valves 550. The valves 530, 540, and 550 can be manual or actuated by other automatic means. Of course, the exact arrangement detailed in this example is simply illustrative and is not meant to limit the scope of the invention. For example, the system could be arranged in a cylindrical, spherical, or other geometry.

The fuels used in the present invention include solutions of (i) a metal hydride, (ii) at least one stabilizing agent, and (iii) a solvent. The term "solution," as used herein, includes a liquid in which all the components are dissolved and/or a slurry in which some of the components are dissolved and some of the components are undissolved solids. The term "about," as used herein, means plus or minus 10% of the stated value.

Complex metal hydrides have been found to be useful in the hydrogen generation systems of the present invention. These complex metal hydrides have the general chemical formula $MBH_4$. M is an alkali metal selected from Group 1 (formerly Group IA) or Group 2 (formerly Group IIA) of the periodic table, examples of which include lithium, sodium, potassium, magnesium, or calcium. M may, in some cases, also be ammonium or organic groups. B is an element selected from group 13 (formerly Group IIIA) of the periodic table, examples of which include boron, aluminum, and gallium. H is hydrogen. Examples of metal hydrides to be used in accordance with the present invention include, but are not limited to, $NaBH_4$, $LiBH_4$, $KBH_4$, $Mg(BH_4)_2$, $Ca(BH_4)_2$, $NH_4BH_4$, $(CH_3)_4NBH_4$, $NaAlH_4$, $LiAlH_4$, $KAlH_4$, $NaGaH_4$, $LiGaH_4$, $KGaH_4$, and mixtures thereof. Without wanting to be limited by any one theory, it is believed that metal hydrides, especially borohydrides, are most stable in water at basic pH's, i.e., the metal hydrides do not readily decompose when in contact with water at high pH's. The following borohydrides are preferred: sodium borohydride ($NaBH_4$), lithium borohydride ($LiBH_4$), potassium borohydride ($KBH_4$), ammonium borohydride ($NH_4BH_4$), tetramethyl ammonium borohydride ($(CH_3)_4NBH_4$), quaternary borohydrides, and mixtures thereof.

The metal hydride solutions of the present invention include at least one stabilizing agent, since aqueous borohydride solutions slowly decompose unless stabilized. A stabilizing agent, as used herein, is any component which retards, impedes, or prevents the reaction of metal hydride with water. Typically, effective stabilizing agents maintain metal hydride solutions at a room temperature (25° C.) pH of greater than about 7, preferably greater than about 11, and more preferably greater than about 13.

Useful stabilizing agents include the corresponding hydroxide of the cation part of the metal hydride salt. For example, if sodium borohydride is used as the metal hydride salt, the corresponding stabilizing agent would be sodium hydroxide. Hydroxide concentrations in stabilized metal hydride solutions of the present invention are greater than about 0.1 molar, preferably greater than about 0.5 molar, and more preferably greater than about 1 molar or about 4% by weight. Typically, metal hydride solutions are stabilized by dissolving a hydroxide in water prior to adding the borohydride salt. Examples of useful hydroxide salts include, but are not limited to, sodium hydroxide, lithium hydroxide, potassium hydroxide, and mixtures thereof. Sodium hydroxide is preferred because of its high solubility in water of about 44% by weight. Although other hydroxides are suitable, the solubility differences between various metal hydrides and various hydroxide salts must be taken into account since such solubility difference can be substantial. For example, adding too much lithium hydroxide to a concentrated solution of sodium borohydride would result in precipitation of lithium borohydride.

Other non-hydroxide stabilizing agents include those that can raise the overpotential of the metal hydride solution to produce hydrogen. These non-hydroxide stabilizing agents are preferably used in combination with hydroxide salts. Nonlimiting examples of non-hydroxide stabilizing agents include compounds containing the softer metals on the right side of the periodic chart. Nonlimiting examples of these non-hydroxide stabilizing agents include compounds containing lead, tin, cadmium, zinc, gallium, mercury, and combinations thereof. Compounds containing gallium and zinc are preferred, because these compounds are stable and soluble in the basic medium. For example, zinc and gallium form soluble zincates and gallates, respectively, which are not readily reduced by borohydride.

Compounds containing some of the non-metals on the right side of the periodic chart are also useful in stabilizing metal hydride solutions. Nonlimiting examples of these non-hydroxide stabilizing agents include compounds containing sulfur, such as sodium sulfide, thiourea, carbon disulfide, and mixtures thereof.

Preferably, the catalyst facilitates both aspects of the reaction of the metal hydride and water: (i) the availability of a hydrogen site and (ii) the ability to assist in the hydrolysis mechanism, i.e., reaction with hydrogen atoms of water molecules. Metal hydride solutions are complex systems having multi-step reduction mechanisms. For example, borohydride has 4 hydrogens and an 8-electron reduction mechanism. Thus, once a single hydrogen atom is removed from a borohydride molecule, the remaining moiety is unstable and will react with water to release the remaining hydrogen atoms. Catalysts that are useful according to the present invention include, but are not limited to, transition metals, transition metal borides, alloys of these materials, and mixtures thereof.

Transition metal catalysts useful in the catalyst systems of the present invention are described in U.S. Pat. No. 5,804,329, issued to Amendola, which is incorporated herein by reference. Transition metal catalysts, as used herein, are catalysts containing Group IB to Group VIIIB metals of the periodic table or compounds made from these metals. Representative examples of these metals include, but are not limited to, transition metals represented by the copper group, zinc group, scandium group, titanium group, vanadium group, chromium group, manganese group, iron group, cobalt group, and nickel group. Transition metal elements or compounds catalyze the chemical reaction $MBH_4 + 2 H_2O \rightarrow 4 H_2 + MBO_2$ and aid in the hydrolysis of water by adsorbing hydrogen on their surface in the form of atomic H, i.e., hydride $H^-$ or protonic hydrogen $H^+$. Examples of useful transition metal elements and compounds include, but are not limited to, ruthenium, iron, cobalt, nickel, copper, manganese, rhodium, rhenium, platinum, palladium, chromium, silver, osmium, iridium, borides thereof, alloys thereof, and mixtures thereof. Ruthenium, cobalt and rhodium and mixtures thereof are preferred.

The catalysts used in the catalyst systems of the present invention preferably have high surface areas. High surface area, as used herein, means that the catalyst particles have small average particles sizes, i.e., have an average diameter of less than about 100 microns, preferably less than about 50 microns, and more preferably less than about 25 microns. The chemical reaction of borohydride and water in the presence of the catalyst follows zero order kinetics at all concentrations of borohydride measured, i.e., volume of hydrogen gas generated is linear with time. It is, therefore, believed that the reaction rate depends primarily on the surface area of the catalyst.

One method of obtaining catalyst particles with high surface areas is to use catalysts with small average particle sizes. Although catalyst with small average particle sizes are preferred, small particles can be swept away by the liquid metal hydride solution if they are small enough to pass through the containment system. Such deficiencies can be avoided by forming large aggregates of the small catalyst particles. Large aggregate catalyst particles, as used herein, are masses or bodies formed from any small catalyst particles by well-known powder metallurgical methods, such as sintering. These metallurgical methods can also be used in making various convenient shapes. It is believed that these large aggregate catalyst particles maintain high surface areas because they are very porous. The catalyst particles are packed into a catalyst chamber.

Alternatively, the hydrogen generation catalysts can be formed into fine wires or a mesh of fine wires. These fine wires have a diameter of less than about 0.5 mm, preferably less than about 0.2 mm, and more preferably less than about 20 microns.

In its simplest form, the catalyst chamber is a liquid and gas permeable mesh that traps or holds particulate catalysts, while allowing liquids and gases to pass freely through the containment system. In this embodiment the catalyst particles are larger than the spaces provided by the containment system. For example, metal hydride solution can flow into the containment system to react with the catalyst, while oxidized metal hydride, hydrogen gas, and unreacted metal hydride can easily pass out of the containment system.

Preferably, the catalyst particles can be encapsulated in a removable tube or cylinder, wherein the ends of the cylinder are covered with the porous or mesh material. Porous or mesh material that are useful herein include ceramics, plastics, polymers, nonwovens, wovens, textiles, fabrics, carbons, carbon-fibers, ion exchange resins, metals, alloys, wires, meshes, and combinations thereof. Typically, the porous or mesh material is in the form of a sheet. Nonlimiting examples of porous or mesh material include nylon screens and stainless steel screens.

A contained high surface area catalyst can be obtained by binding or entrapping a transition metal catalyst onto and/or within a porous or nonporous substrate by chemical means. By porous is meant that the material is liquid and gas permeable. Generally, this process includes (i) dispersing a solution having a transition metal ion onto and/or within a substrate by contacting the solution with the substrate, and (ii) reducing the dispersed transition metal ions to the neutral valence state of the transition metal, i.e., metallic form. Without wanting to be limited by any one theory, it is believed that this unique process binds and/or entraps transition metal catalyst at a molecular level onto and/or within the substrate. These steps can also be repeated to obtain layers of transition metal molecules bound onto and/or entrapped within the substrate. High surface area for substrate bound catalysts, as used herein, means that a porous substrate has an effective surface area of greater than about 10 $m^2/g$ or and a nonporous substrate has an average diameter of less than about 50 microns. Nonlimiting examples of porous substrates include ceramics and ionic exchange resins. Nonlimiting examples of nonporous substrates includes, metals, wires, metallic meshes, fibers and fibrous materials, such as ropes.

Transition metal ion, as used herein, means an anion, a cation, an anion complex or a cation complex of a transition metal that is described above. Transition metal ions can be obtained from dissolving salts of transition metals, which are readily available from commercial manufacturers, such as Alfa Aesar Company and Aldrich Chemical Company. The transition metal salts may be dissolved in any solvent, typically water. The reducing agent can be any material or compound that is capable of reducing the transition metal ion to its neutral valence state. Nonlimiting examples of reducing agents include hydrazine, hydrogen gas, glucose hydroxylamine, carbon monoxide, dithionite, sulfur dioxide, borohydride, alcohols and mixtures thereof. Typically, most transition metals that catalyze metal hydrides, such as borohydride, can also be reduced by the same metal hydrides. For example, borohydride is a suitable reducing agent.

Nonlimiting examples of suitable substrates include ceramics, plastics, polymers, glass, fibers, ropes, nonwovens, wovens, textiles, fabrics, the many forms of carbon and carbon-fibers, ion exchange resins, metals, alloys, wires, meshes, and combinations thereof. Nonlimiting examples of ceramic substrates with various pore sizes include metal oxides, zeolites, perovskites, phosphates, metal wires, metal meshes, and mixtures thereof. Specific examples of suitable substrates include, but are not limited to zirconium oxides, titanium oxides, magnesium oxides, calcium oxides, zeolites, cationic exchange resins, anionic exchange resins, fibrous materials, nonwovens, wovens, aramid fibers such as NOMEX® and KEVLAR®, polytetrafluoroethylene (PTFE), and combinations thereof. Since metal hydride solutions can have a high pH, substrates that do not dissolve or react with caustics are preferred. Also preferred are porous substrates with effective surface areas of greater than about 50 $m^2/g$ or nonporous substrates with an average diameter of less than about 50 microns.

When the substrate is in the form of beads, it is preferable to have the beads in a containment system, as described above, wherein the average diameter of the beads is greater than the spaces of the containment system. Furthermore, if the substrate has a surface treatment, such treatments can be removed by appropriate methods, such as by boiling or applying a solvent. For example, substrates treated with wax can be boiled. Alternatively, the wax can be removed by using acetone. Similarly, the starch on textiles can be removed by boiling in water.

The substrates, except for the ion exchange resins described below, can be treated with the catalyst in the following manner. The substrate is first soaked in a solution containing the transition metal salt, e.g., ruthenium trichloride. Solutions having concentrations close to saturation are preferred. This step disperses the transition metal salt into and/or onto the substrate. The treated substrate is then dried, typically with heat. Optionally, the treated substrate can be filtered before being dried. Note that the treated substrate is not rinsed. It is believed that the drying step promotes absorption of the transition metal ions onto and/or within the substrate by removing the solvent. The dry, treated substrate is then subjected to a solution containing a reducing agent, such as sodium borohydride, at a concentration sufficient to provide complete reduction, e.g., 5% by weight of sodium borohydride. Although this step can be conducted at room temperature, it is preferred to reduce the absorbed transition metal ions at an elevated temperature, e.g., greater than about 30° C., to increase the reduction rate. It is believed that the reduction step converts transition metal ions into its neutral valence state, i.e., the metallic state. After rinsing with water, the substrate is ready for use as a catalyst in the reaction of the metal hydride and water to produce hydrogen gas. The method can be repeated to obtain a desired loading of transition metal onto and/or within the substrate.

This method to obtain a contained high surface area catalyst can also be adapted to utilize chemical vapor deposition technology (CVD) by forming a transition metal complex that can be evaporated, i.e., boiled or sublimed, in a vacuum. The transition metal complex includes a transition metal ion, as described above, and a chemical vapor deposition complexing compound. Since the substrate is cold, the transition metal complex will recondense onto the substrate. Any suitable substrate, as described above, can be used. Any suitable chemical vapor deposition complexing compound that is known in the art can also be used. Nonlimiting examples of metal complexes useful for chemical vapor deposition are metal diketonates such as Ru(acac) or Co(acac)$_3$ and metal alkoxides such as Ti(OiPr)$_4$ (acac=acetylacetonate; OiPr=isopropoxide). The transition metal complex that is deposited on the substrate can then be reduced by any of the above described reducing agents.

Alternatively, this method can be adapted to utilize electroplating techniques, i.e., electroplating a conductive substrate in a solution having a transition metal ion. Useful transition metal ions are described above. The transition metal can be electroplated onto a conductive substrate, such as nickel or stainless steel fine wire, screens comprising such fine wires, or metallic sheets. Typically, such fine wires can have an average diameter of less than about 20 microns, preferably less than about 10 microns, and more preferably less than about 2 microns.

In one preferred mode of electrochemical plating, a rough coating is obtained instead of the typical smooth or "bright coatings." Without wanting to be limited by any one theory, it is believed that these rough coatings have a high surface area. These rough coatings are often black in color, and are typically referred to in the art of electrochemical plating by the element name followed by the word "black," e.g., platinum black or ruthenium black. Most of the transition metals described above can be coated as "transition metal blacks." The exact conditions may vary between the elements, but the common parameter is application of a varying voltage during the plating process. "Varying voltage" means that the voltage is changed, alternated, stepped up, or stepped down in a cyclic or noncyclic manner. For example, a DC voltage can be turned on or off over time. Alternatively, the current can be periodically reversed, or the voltage may be switched from a lower to higher voltage and then back to the lower voltage. It is also common to superimpose an AC signal onto a DC source.

In still another example, this method to obtain a contained high surface area catalyst can also be adapted to utilize sputter deposition technology, e.g., physical vapor deposition, which is well known to those skilled in the art of surface coating technology. In sputter deposition, atoms of a metal surface are vaporized by the physical ejection of particles from a surface induced by momentum transfer from an energetic bombarding species, such as an ion or a high-energy neutral atom, preferably from one of the inert noble gases. The target atoms evaporate into the vacuum chamber and then condense on the substrate to form a thin film. Typically, the hydrogen generation catalyst substrate is mounted in a sputtering chamber, with one side facing up or down toward a metal electrode target (examples include, but are not limited to Ni, Pt, Ru, Os, Ag or alloys of these metals). After evacuating the chamber, an inert gas, such as argon, is used to backfill the chamber to a pressure from about 10 to about 50 millitorr (from about 1.3 to about 6.7 Pa). The sputtering process is initiated by applying a high voltage between the target and the chamber wall. The sputtering process is continued for an amount of time (typically a few minutes but ranging from less than a minute up to a few hours) according to the desired thickness of catalyst loading on the substrate. Upon completion of sputtering, air is readmitted to the chamber to remove the coated substrate.

While most of these substrates simply absorb the solution of transition metal salts, ion exchange resins offer some surprising and interesting characteristics. Ion exchange resins are porous polymeric materials having active groups at the end of the polymer chains. Typically, polymers used in ion exchange resins include, but are not limited to, polystyrene, epoxy amines, epoxy polyamines, phenolics, and acrylics. Ion exchange resins are classified into anionic exchange resins and cationic exchange resins. These resins are commercially available as beads, typically having particle sizes from about 20 mesh to about 100 mesh. The resins are also available as sheets and can be fabricated into any shape desired.

Anionic exchange resins attract anions because the active groups at the ends of the polymers have positive charges. Nonlimiting examples of positively charged active groups include a quaternary ammonium, tertiary amine, trimethyl benzyl ammonium, and/or dimethyl ethanol benzyl ammonium. Commercial anionic exchange resins are typically supplied in the Cl$^-$ or OH$^-$ form, i.e., easily replaceable chloride ions or hydroxide ions are bound to the active groups having positive charges. Commercially available anionic exchange resins include, but are not limited to, A-26, A-36, RA-400 and IRA-900, manufactured by Rohm & Haas, Inc., located in Philadelphia, Pa.; Dowex 1, Dowex 2, Dowex 21 K, Dowex 550A, Dowex MSA-1, and Dowex MSA-2, manufactured by Dow Corporation; Duolite A-101 D, Duolite A-102 D, and Duolite A-30 B; and Ionac A-540, Ionac A-550, and Ionac A-300.

Cationic exchange resins attract cations because the active groups at the ends of the polymers have negative charges. Nonlimiting examples of negatively charged active groups include sulfonic acid, carboxylic acid, phosphonic acid, and/or aliphatic acid. Commercial cationic exchange resins are typically supplied in the Na$^+$ or H$^+$ form, i.e., easily replaceable sodium or hydrogen ions are bound to the active groups having negative charges. Commercially available cationic exchange resins include, but are not limited to, Nafion resins, manufactured by Dupont Corp., located in Wilmington, Del.; IRA-120 and Amberlyst 15 manufactured by Rohm & Haas, Inc., located in Philadelphia, Pa.; Dowex 22, Dowex 50, Dowex 88, Dowex MPC-1, and Dowex HCR-W2 and Dowex CCR-1, manufactured by Dow Corporation; Duolite C-3, Duolite ES-63, and Duolite ES-80; and Ionac 240.

Anionic exchange resin beads are treated with the catalyst in the following manner. A transition metal salt is dissolved in an acid having the corresponding anion that can form an anionic complex of the transition metal. For example, ruthenium trichloride can be dissolved in hydrochloric acid to form chlororuthenic acid, wherein the ruthenium is contained in an anionic complex, i.e., $[RuC_6]^{-3}$. Typically, the anionic complex of a transition metal is characterized by the chemical formula $[M^{y+}X_6]^{(y-6)}$, wherein M is a transition metal, y is the valence of the transition metal, and X is an anion with a single negative charge. The concentration of the transition metal solution can be varied accordingly, but a concentration close to saturation is preferred. The acidic solution containing the anionic transition metal complex can then be exchanged onto the anionic exchange resin beads by contacting the anionic exchange resin beads with the anionic transition metal solution. Typically, this is done either by soaking the beads in the solution or dropwise adding the solution onto the beads. Without wanting to be limited by any one theory, it is believed that the anion associated with the active group of the resin is exchanged with the anionic transition metal complex. Exchange, as used herein, means that the ion associated with the active groups of the ion exchange resin, e.g., the chloride, is substituted with the ion of the transition metal. As a result, a very strong chemical (ionic) bond is formed between the anionic transition metal complex and the active group of the ion exchange resin at each active group site.

Upon exposure to a reducing agent, such as sodium borohydride, the anionic transition metal complex is reduced at the exchange site to its neutral valence state, i.e., the metallic state. The result is a distribution of transition metal catalyst molecules in and/or on the resin. The process may be repeated to obtain higher metal content if desired, because the reduction step restores the anion at the positively charged active groups of the exchange resin. It is believed that the restored anion associated with the active group is either the anion that had been formerly associated with the transition metal, e.g., chloride from the $[RuCl_6]^{-3}$, or the reducing agent. After rinsing with water, the treated anionic exchange resin beads are ready for use as a catalyst in the reaction of the metal hydride and water to produce hydrogen gas.

Catalyst treatment of cationic exchange resin beads require a slightly different procedure, because the affinity of the cation transition metal complexes for the cationic exchange resins is much weaker than the affinity of anion transition metal complexes for the anionic exchange resins. Despite this additional complication, cationic exchange resins are particularly useful because they can typically withstand harsher environments, especially higher temperatures.

Although transition metals are formally written in their cationic valence state, e.g. $Ru^{+3}$, transition metals form anionic complexes in the presence of common complexing ions, such as chloride. Such anionic transition metal complexes would have little or no attraction for a cation exchange resin bead having negatively charged active groups. This can be avoided by using transition metal salts having non-complexing anions. Non-complexing anions, as used herein, refers to ions that are typically very large and contain a central atom that is fully coordinated, thereby leaving little activity for further complexing with the transition metal. Nonlimiting examples of non-complexing anions of this type include perchlorate ($ClO_4^-$), hexafluorophosphate ($PF_6^-$), and tetrafluoroborate ($BF_4^-$), and mixtures thereof. Transition metal salts having non-complexing anions can be obtained via a precipitation reaction with a transition metal salt and an equimolar amount of a compound having a non-complexing anion. The compound having the non-complexing anion is chosen so that the anion from the transition metal salt precipitates out with the cation associated with the non-complexing anion. For example, a solution of ruthenium trichloride can be reacted with an equimolar amount of silver perchlorate solution. The chloride will precipitate out of solution as silver chloride and leave ruthenium perchlorate in solution. Since perchlorate ions can not complex like chloride ions, only the ruthenium will be hydrated in the cationic form, i.e., $[Ru.xH_2O]^{3+}$, wherein x refers to the number of water molecules. It is believed that the hydrated ruthenium typically has a chemical formula $[Ru.6H_2O]^{+3}$.

The pH of the solution containing both transition metal ion and non-complexing ion should be adjusted to as close to 7 as possible without precipitation of ruthenium as a hydrated oxide, before contacting the cationic exchange resin beads. Preferably, the solution containing the transition metal ion and the non-complexing ion has a pH of greater than or equal to about 2, more preferably greater than or equal to about 4, most preferably greater than or equal to about 7. This pH adjustment prevents hydrogen cations, H+, from competing for cationic sites, i.e., associate with the negatively charged active groups, of the cationic exchange resin. For example, if a 1 Molar solution of ruthenium is used and the pH is 2, ruthenium ions will outnumber hydrogen ions by a factor of 100. Although the ratio of ruthenium ions to hydrogen ions at pH 2 is sufficient, the ratio would be even better at pH's closer to 7. Without wanting to be limited by any one theory, it is believed that upon contacting the cationic exchange resin beads with the transition metal salt solutions, the positively charged transition metal ions exchange with the positive ions initially associated with the negatively charged active groups of the cationic exchange resin.

To insure high displacements of the transition metal ions without using excessive quantities of transition metal salt solutions, the exchange can be performed by contacting the cationic exchange beads with transition metal salt solutions in a tube or column. This method can also be used to treat the previously-described anionic exchange resins. The tube or column is usually mounted vertically and filled with cationic exchange beads. The solution containing transition metal ions and non-complexing ions is allowed to pass through the column of beads. Typically, more dilute solutions are used first and then progressively more concentrated solutions can be used thereafter, thereby allowing the use of the concentrated solutions from the end of prior batches at the beginning of subsequent batches. Large quantities of catalyst treated cationic resin beads can be produced by utilizing a continuous counter-current system that allows virtually complete utilization of ruthenium and complete saturation of the beads. A continuous counter-current system means contacting the more dilute ruthenium solution with the less treated beads and the more concentrated ruthenium solution with the more treated beads. After exchanging the transition metals onto and/or into the beads, the cationic exchange resins are rinsed with deionized water and then reacted with a solution containing a reducing agent, such as sodium borohydride, to reduce the ruthenium to its neutral valence state. Higher transition metal content can be obtained by repeating the exchange and/or reduction steps, because the reduction step restores cations at the negatively charged active groups of the exchange resin. It is believed that the restored cation associated with the active group is provided by the reducing agent, i.e., sodium from the sodium borohydride. After rinsing with water, the treated cationic exchange resin beads are ready for use as a catalyst in the reaction of the metal hydride and water to produce hydrogen gas.

In a preferred embodiment the catalyst chamber is a wound spiral of tubing including catalyst such that fuel enters the tubing at the center of the spiral and flows through the spiral wound tubing.

We claim:

1. An arrangement for generating hydrogen gas comprising:
   (a) a catalyst chamber comprising a catalyst;
   (b) a fuel chamber connected to the catalyst chamber, the fuel chamber being configured to store a reactant material comprising a borohydride capable of generating hydrogen gas when contacting said catalyst;
   (c) a spent fuel chamber connected to the catalyst chamber, the spent fuel chamber being configured to receive borate and hydrogen gas, the borate and the hydrogen gas being generated by contacting the borohydride and the catalyst, the spent fuel chamber being further configured to retain the borate separate from the reactant material;
   (d) a gas conduit in direct communication with the spent fuel chamber and with the fuel chamber, the conduit including a check valve, the check valve being configured to allow unidirectional flow of hydrogen gas; and
   (e) a hydrogen gas outlet conduit connected to the gas conduit.

2. Apparatus for use in a system for generating hydrogen, said apparatus comprising:
   a fuel container having an internal pressure;
   a reactant material capable of generating hydrogen disposed within said fuel container, said fuel container having an outlet port which can be opened and closed, said internal pressure pushing said reactant material through said outlet port when it is open;
   a product container;
   a gas conduit between the product container and the fuel container; and
   a check valve in communication with said gas conduit, the check valve being configured to allow hydrogen gas to flow in only one direction.

3. The apparatus of claim 2 wherein said reactant material at least one of $NaBH_4$, $LiBH_4$, $KBH_4$, $Mg(BH_4)_2$, $Ca(BH_4)_2$, $NH_4BH_4$, $(CH_3)_4$, $NaAlH_4$, $LiAlH_4$, $KAlH_4$, $NaGaH_4$, $LiGaH_4$, and $KGaH_4$.

4. The apparatus of claim 2 wherein said container also includes a stabilizer agent.

5. The apparatus of claim 2 wherein said stabilizer agent includes at least one of sodium hydroxide, lithium hydroxide, potassium hydroxide and compounds including lead, tin, cadmium, zinc, gallium and mercury.

6. The apparatus of claim 2 wherein said positive internal pressure is provided by a gas.

7. The apparatus of claim 6 wherein said gas is hydrogen.

8. The apparatus of claim 7 wherein said hydrogen gas is a portion of the hydrogen generated by said system.

9. An arrangement for generating hydrogen gas comprising:
   (a) a catalyst chamber comprising a catalyst;
   (b) a fuel chamber connected to the catalyst chamber, the fuel chamber being configured to retain a reactant material under a predetermined pressure, said reactant material being capable of generating hydrogen gas when contacting said catalyst;
   (c) a spent fuel chamber connected to the catalyst chamber for receiving product material and hydrogen gas generated by contacting the reactant material and the catalysts, the spent fuel chamber being configured to retain the borate separate from the reactant material;
   (d) a gas conduit between the spent fuel chamber and the fuel chamber; and
   (e) a check valve in communication with said gas conduit, the check valve being configured to allow the hydrogen to flow in one direction.

10. The arrangement of claim 9 wherein the pressure is provided by a gas and said fuel chamber includes an exit valve, and the pressure pushing said reactant material from said fuel chamber when said exit valve is opened.

11. The arrangement of claim 10 wherein the gas is hydrogen.

* * * * *